United States Patent
Enomoto et al.

(10) Patent No.: US 8,140,305 B2
(45) Date of Patent: Mar. 20, 2012

(54) CONVERSION OF AN APPLICATION PROGRAM

(75) Inventors: Satoshi Enomoto, Yokohama (JP); Hiroyasu Ohsaki, Yokohama (JP); Kazuyuki Tsuda, Inagi (JP)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/873,716

(22) Filed: Oct. 17, 2007

(65) Prior Publication Data
US 2008/0103752 A1 May 1, 2008

(30) Foreign Application Priority Data
Nov. 1, 2006 (JP) .................................. 2006-298055

(51) Int. Cl.
*G06F 9/455* (2006.01)
(52) U.S. Cl. .............................. 703/6; 717/104; 717/113
(58) Field of Classification Search ................... 703/2, 1, 703/13, 6, 22; 715/203, 762; 725/37; 707/2; 717/126, 106, 113, 104, 108; 340/511; 709/218; 705/7; 700/94, 83; 719/318; 434/365
See application file for complete search history.

(56) References Cited

U.S. PATENT DOCUMENTS

| | | | | |
|---|---|---|---|---|
| 5,537,529 | A * | 7/1996 | Borovoy et al. | 715/203 |
| 7,324,931 | B1 * | 1/2008 | Warlock | 703/13 |
| 7,412,367 | B1 * | 8/2008 | Warlock et al. | 703/6 |
| 7,861,218 | B2 * | 12/2010 | Hussey | 717/108 |
| 2002/0099581 | A1 * | 7/2002 | Chu et al. | 705/7 |
| 2003/0135584 | A1 * | 7/2003 | Roberts et al. | 709/218 |
| 2003/0154476 | A1 * | 8/2003 | Abbott et al. | 725/37 |
| 2003/0229478 | A1 * | 12/2003 | Rappaport et al. | 703/13 |
| 2004/0111702 | A1 * | 6/2004 | Chan | 717/113 |
| 2004/0215599 | A1 * | 10/2004 | Apps et al. | 707/2 |
| 2004/0216134 | A1 * | 10/2004 | Hammerich et al. | 719/318 |
| 2005/0007249 | A1 * | 1/2005 | Eryurek et al. | 340/511 |
| 2005/0203718 | A1 * | 9/2005 | Carek et al. | 703/1 |
| 2005/0261884 | A1 * | 11/2005 | Sakamoto et al. | 703/13 |
| 2006/0005170 | A1 * | 1/2006 | Rosaria et al. | 717/126 |
| 2006/0064669 | A1 * | 3/2006 | Ogilvie et al. | 717/106 |
| 2006/0199167 | A1 * | 9/2006 | Yang et al. | 434/365 |
| 2006/0235548 | A1 * | 10/2006 | Gaudette | 700/83 |
| 2006/0282252 | A1 * | 12/2006 | Ciolfi | 703/22 |

(Continued)

FOREIGN PATENT DOCUMENTS
JP 2000020296 1/2000

OTHER PUBLICATIONS
Kukkala et al., "Performance modeling and reporting for the UML 2.0 desin of embedded systems", IEEE 2005.*

*Primary Examiner* — Kandasamy Thangavelu
(74) *Attorney, Agent, or Firm* — DeLizio Gilliam, PLLC

(57) ABSTRACT

A model for an application program is displayed. The model includes an input interface, an output interface, and a plurality of variables. Addition of a new variable and placement of an annotation on the display unit for the new variable is detected. The annotation identifies the new variable as an individually definable object or an identification key. The identification key identifies an individual situation and the individually definable object copes with the individual situation. A new model with a new input interface and a new output interface is generated based, at least in part, on the annotation identifying the new variable as an individually definable object or an identification key.

16 Claims, 12 Drawing Sheets

U.S. PATENT DOCUMENTS

2007/0043459 A1* 2/2007 Abbott et al. .................. 700/94
2007/0050719 A1* 3/2007 Lui et al. ...................... 715/762
2007/0150322 A1* 6/2007 Falchuk et al. .................. 705/7
2007/0198656 A1* 8/2007 Mazzaferri et al. ........... 709/218
2007/0220342 A1* 9/2007 Vieira et al. .................... 714/33
2007/0288885 A1* 12/2007 Brunel et al. ................. 717/104

* cited by examiner

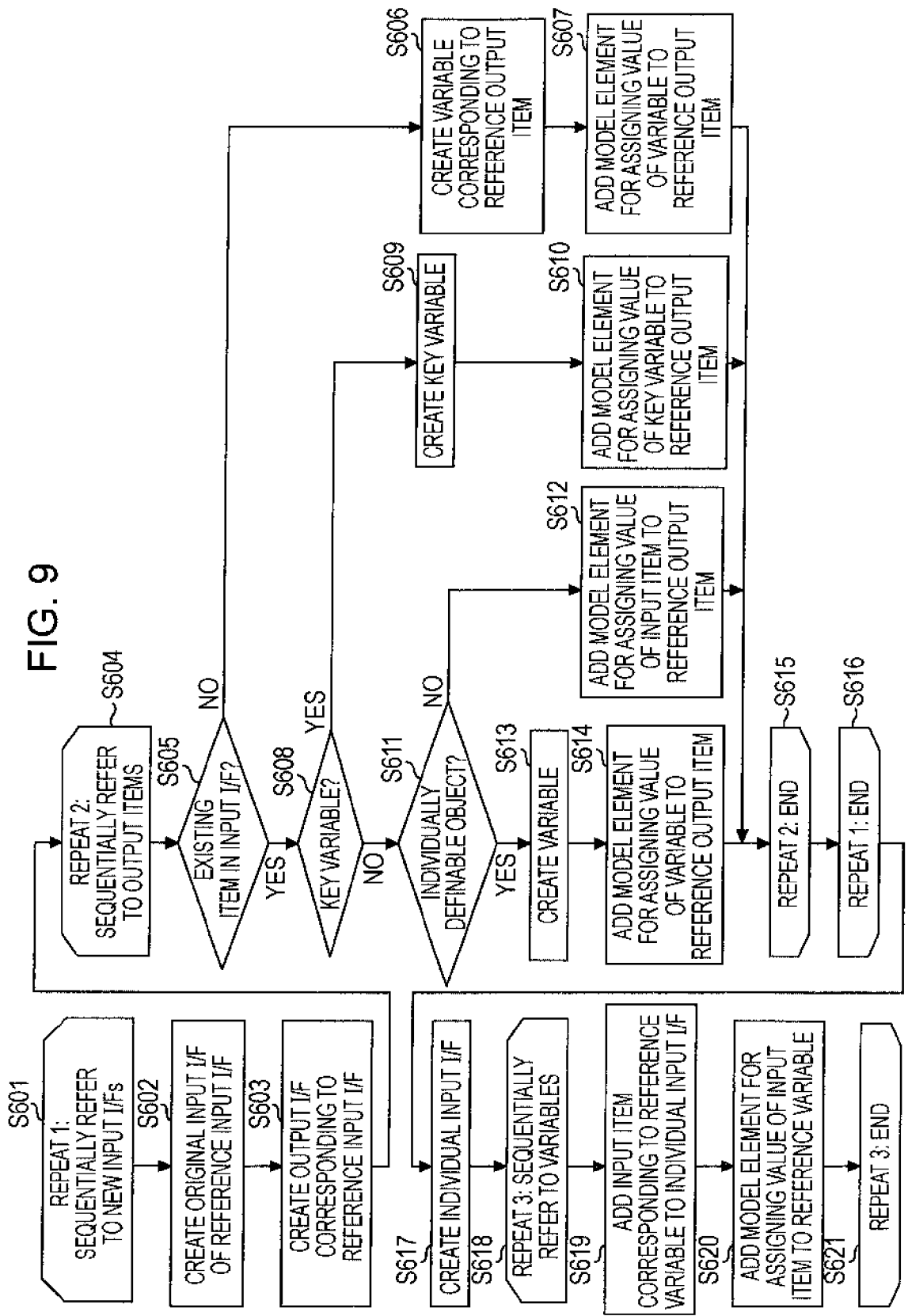

| No. | INTERFACE NAME | TYPE | ITEM 1 | ITEM 2 | ITEM 3 | ITEM 4 | ITEM 5 |
|---|---|---|---|---|---|---|---|
| 1 | PRICE DIFFERENCE SETTING | I | PRODUCT NAME | PRICE | ACCEPTABLE PRICE DIFFERENCE | | |
| 2 | COMPETITOR PRICE | I | COMPANY NAME | PRODUCT NAME | PRICE | | |
| 3 | ALERT PRODUCT | O | PRODUCT NAME | PRICE | COMPANY NAME | COMPETITOR PRICE | |

(b)

| No. | VARIABLE NAME | KEY |
|---|---|---|
| 1 | PRODUCT NAME | O |
| 2 | PRICE | |
| 3 | ACCEPTABLE PRICE DIFFERENCE | |

(c)

| No. | SOURCE TYPE | SOURCE NAME | DESTINATION TYPE | DESTINATION NAME |
|---|---|---|---|---|
| 1 | INTERFACE | PRICE DIFFERENCE SETTING. PRODUCT NAME | VARIABLE | PRODUCT NAME |
| 2 | INTERFACE | PRICE DIFFERENCE SETTING. PRICE | VARIABLE | PRICE |
| 3 | INTERFACE | PRICE DIFFERENCE SETTING. ACCEPTABLE PRICE DIFFERENCE | VARIABLE | ACCEPTABLE PRICE DIFFERENCE |
| 4 | VARIABLE | PRODUCT NAME | INTERFACE | ALERT PRODUCT. PRODUCT NAME |
| 5 | VARIABLE | PRICE | INTERFACE | ALERT PRODUCT. PRICE |
| 6 | INTERFACE | COMPETITOR PRICE. COMPANY NAME | INTERFACE | ALERT PRODUCT. COMPANY NAME |
| 7 | INTERFACE | COMPETITOR PRICE. PRICE | INTERFACE | ALERT PRODUCT. COMPETITOR PRICE |

| No. | INTERFACE NAME | TYPE | ITEM 1 | ITEM 2 | ITEM 3 | ITEM 4 | ITEM 5 |
|---|---|---|---|---|---|---|---|
| 1 | BRANCH PRICE DIFFERENCE SETTING | I | BRANCH NAME | PRODUCT NAME | PRICE | ACCEPTABLE PRICE DIFFERENCE | |
| 2 | COMPETITOR PRICE | I | COMPANY NAME | PRODUCT NAME | PRICE | | |
| 3 | BRANCH ALERT PRODUCT | O | BRANCH NAME | PRODUCT NAME | PRICE | COMPANY NAME | COMPETITOR PRICE |

(b)

| No. | VARIABLE NAME | KEY |
|---|---|---|
| 1 | BRANCH NAME | O |
| 2 | PRODUCT NAME | O |
| 3 | PRICE | |
| 4 | ACCEPTABLE PRICE DIFFERENCE | |

(c)

| No. | SOURCE TYPE | SOURCE NAME | DESTINATION TYPE | DESTINATION NAME |
|---|---|---|---|---|
| 1 | INTERFACE | BRANCH PRICE DIFFERENCE SETTING. BRANCH NAME | VARIABLE | BRANCH NAME |
| 2 | INTERFACE | BRANCH PRICE DIFFERENCE SETTING. PRODUCT NAME | VARIABLE | PRODUCT NAME |
| 3 | INTERFACE | BRANCH PRICE DIFFERENCE SETTING. PRICE | VARIABLE | PRICE |
| 4 | INTERFACE | BRANCH PRICE DIFFERENCE SETTING. ACCEPTABLE PRICE DIFFERENCE | VARIABLE | ACCEPTABLE PRICE DIFFERENCE |
| 5 | VARIABLE | BRANCH NAME | INTERFACE | BRANCH ALERT PRODUCT. BRANCH NAME |
| 6 | VARIABLE | PRODUCT NAME | INTERFACE | BRANCH ALERT PRODUCT. PRODUCT NAME |
| 7 | VARIABLE | PRICE | INTERFACE | BRANCH ALERT PRODUCT. PRICE |
| 8 | INTERFACE | COMPETITOR PRICE. COMPANY NAME | INTERFACE | BRANCH ALERT PRODUCT. COMPANY NAME |
| 9 | INTERFACE | COMPETITOR PRICE. PRICE | INTERFACE | BRANCH ALERT PRODUCT. COMPETITOR PRICE |

| No. | INTERFACE NAME | TYPE | ITEM 1 | ITEM 2 | ITEM 3 | ITEM 4 | ITEM 5 |
|---|---|---|---|---|---|---|---|
| 1 | BRANCH PRICE DIFFERENCE ENTRY | I | BRANCH NAME | PRODUCT NAME | ACCEPTABLE PRICE DIFFERENCE | | |
| 2 | PRICE DIFFERENCE SETTING | I | PRODUCT NAME | PRICE | ACCEPTABLE PRICE DIFFERENCE | | |
| 3 | BRANCH PRICE DIFFERENCE SETTING | O | BRANCH NAME | PRODUCT NAME | PRICE | ACCEPTABLE PRICE DIFFERENCE | |

(b)

| No. | VARIABLE NAME | KEY |
|---|---|---|
| 1 | BRANCH NAME | O |
| 2 | PRODUCT NAME | O |
| 3 | ACCEPTABLE PRICE DIFFERENCE | |

(c)

| No. | SOURCE TYPE | SOURCE NAME | DESTINATION TYPE | DESTINATION NAME |
|---|---|---|---|---|
| 1 | INTERFACE | BRANCH PRICE DIFFERENCE ENTRY. BRANCH NAME | VARIABLE | BRANCH NAME |
| 2 | INTERFACE | BRANCH PRICE DIFFERENCE ENTRY. PRODUCT NAME | VARIABLE | PRODUCT NAME |
| 3 | INTERFACE | BRANCH PRICE DIFFERENCE ENTRY. ACCEPTABLE PRICE DIFFERENCE | VARIABLE | ACCEPTABLE PRICE DIFFERENCE |
| 4 | VARIABLE | BRANCH NAME | INTERFACE | BRANCH PRICE DIFFERENCE SETTING. BRANCH NAME |
| 5 | VARIABLE | PRODUCT NAME | INTERFACE | BRANCH PRICE DIFFERENCE SETTING. PRODUCT NAME |
| 6 | VARIABLE | ACCEPTABLE PRICE DIFFERENCE | INTERFACE | BRANCH PRICE DIFFERENCE SETTING. ACCEPTABLE PRICE DIFFERENCE |
| 7 | INTERFACE | PRICE DIFFERENCE SETTING. PRICE | INTERFACE | BRANCH PRICE DIFFERENCE SETTING. PRICE |

CONVERSION OF AN APPLICATION PROGRAM

CROSS-REFERENCE TO RELATED APPLICATIONS

This application claims the benefit of priority, under 35 U.S.C. §119(a), of Japanese Patent Application No. 2006-298055 filed on Nov. 1, 2006, and entitled "APPARATUS, METHOD, AND PROGRAM FOR CONVERSION OF APPLICATION PROGRAM" hereby incorporated by reference herein for all purposes.

FIELD

Embodiments of the invention(s) relate to conversion of an application program, and particularly relates to using a model of an application program as a template for a new model for an application program.

BACKGROUND

In general, an execution entity, such as an application program, is often required to cope with an individual situation that is realized after the program is created. For example, suppose a program is created which stores data about an individual situation on the basis of an external input and outputs the corresponding information according to the identified situation, it often becomes necessary later to individually change or add a threshold value for identifying the situation, e-mail addresses to which such information is to be output, or the like.

In such a case, it is necessary to modify an existing application program. Examples of conventional techniques for supporting modification of an application program include a technique which focuses on changing one of a plurality of arguments in function call description of a source program.

SUMMARY

Embodiments of the invention(s) include a method that comprises displaying a model for an application program. The model includes an input interface, an output interface, and a plurality of variables. Addition of a new variable and placement of an annotation on the display unit for the new variable is detected. The annotation identifies the new variable as an individually definable object or an identification key. The identification key identifies an individual situation and the individually definable object copes with the individual situation. A new model with a new input interface and a new output interface is generated based, at least in part, on the annotation identifying the new variable as an individually definable object or an identification key.

BRIEF DESCRIPTION OF THE DRAWINGS

The present embodiments may be better understood, and numerous objects, features, and advantages made apparent to those skilled in the art by referencing the accompanying drawings.

FIG. 9 depicts a flowchart illustrating an operation of a new model creation unit according to an embodiment of the invention.

FIG. 10 depicts exemplary management data for managing a design model according to an embodiment of the invention.

FIG. 11 depicts exemplary management data for managing a design model after conversion of input and output interfaces according to an embodiment of the invention.

FIG. 12 depicts exemplary management data for managing a design model that is newly created according to an embodiment of the invention.

DESCRIPTION OF EMBODIMENT(S)

Here, examples of "portion of an application program" include an interface for passing data to or from another application program. In this case, the generation unit of the first apparatus generates an interface capable of passing a value to or from the first or second element as "portion of an application program". Likewise, the generation unit of the second apparatus generates an interface capable of passing a value to or from the first or second variable as "portion of an application program".

Figure 1:
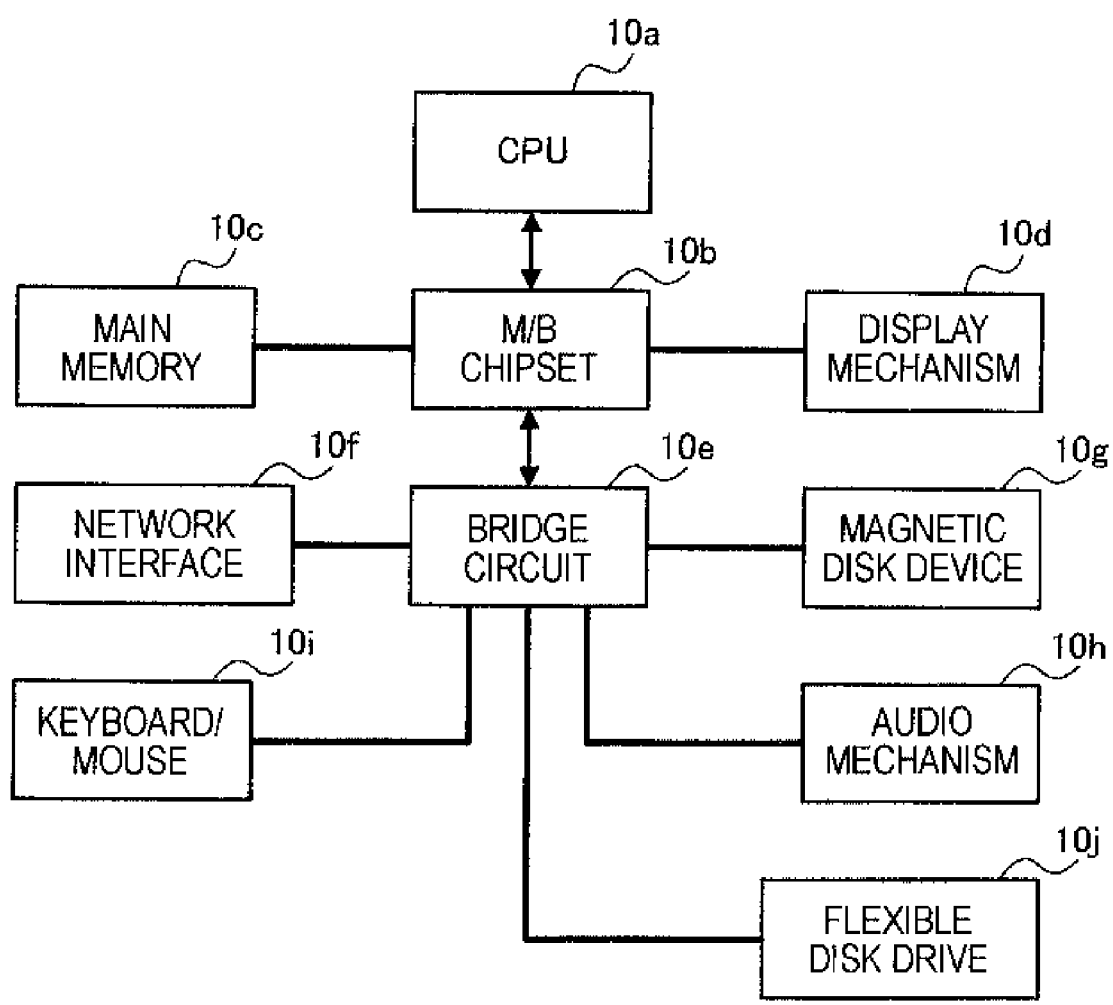
FIG. 1 depicts a hardware configuration of a computer to which an embodiment of the invention is applicable.

FIG. 1 illustrates an exemplary hardware configuration of a computer suitable for use as an application conversion apparatus for converting an application program (hereinafter simply referred to as "application") in the embodiment. As illustrated, the computer includes a central processing unit (CPU) 10$a$ serving as a computing means, a main memory 10$c$ connected via a motherboard (M/B) chipset 10$b$ to the CPU 10$a$, and a display mechanism 10$d$ also connected via the M/B chipset 10$b$ to the CPU 10$a$. At the same time, a network interface 10$f$, a magnetic disk device (HDD) 10$g$, an audio mechanism 10$h$, a keyboard/mouse 10$i$, and a flexible disk drive 10$j$ are connected via a bridge circuit 10$e$ to the M/B chipset 10$b$.

The components illustrated in FIG. 1 are connected to each other via a bus. For example, the CPU 10$a$ and the M/B chipset 10$b$ are connected to each other via a CPU bus, while the M/B chipset 10$b$ and the main memory 10$c$ are also connected to each other via a CPU bus. The M/B chipset 10$b$ and the display mechanism 10$d$ may be connected to each other via an accelerated graphics port (AGP). If the display mechanism 10$d$ includes a video card that supports PCI Express, the M/B chipset 10$b$ and this video card are connected to each other via a PCI Express (PCIe) bus. For connection to the bridge circuit 10$e$, the network interface 10$f$ can use, for example, PCI Express. As for the magnetic disk device 10$g$, for example, a serial AT Attachment (ATA), ATA for parallel transfer, or Peripheral Components Interconnect (PCI) can be used. As for the keyboard/mouse 10$i$ and the flexible disk drive 10$j$, a Universal Serial Bus (USB) can be used for connection to the bridge circuit 10$e$.

A model a model (hereinafter referred to as "design model") created, in the application design process, as a representation of the processing of an application is used to describe the operation of application conversion. In other words, the conversion of an application is described by describing the conversion of a design model. It may be considered that this is conversion of an actual design model and that conversion of an application is realized by automatically generating an application on the basis of the design model obtained after the conversion. Alternatively, it may be considered that this design model is merely a schematic representation of processing of an application and that conversion of an application is realized by automatically applying conversion similar to the conversion of the design model to the application.

Figure 2:
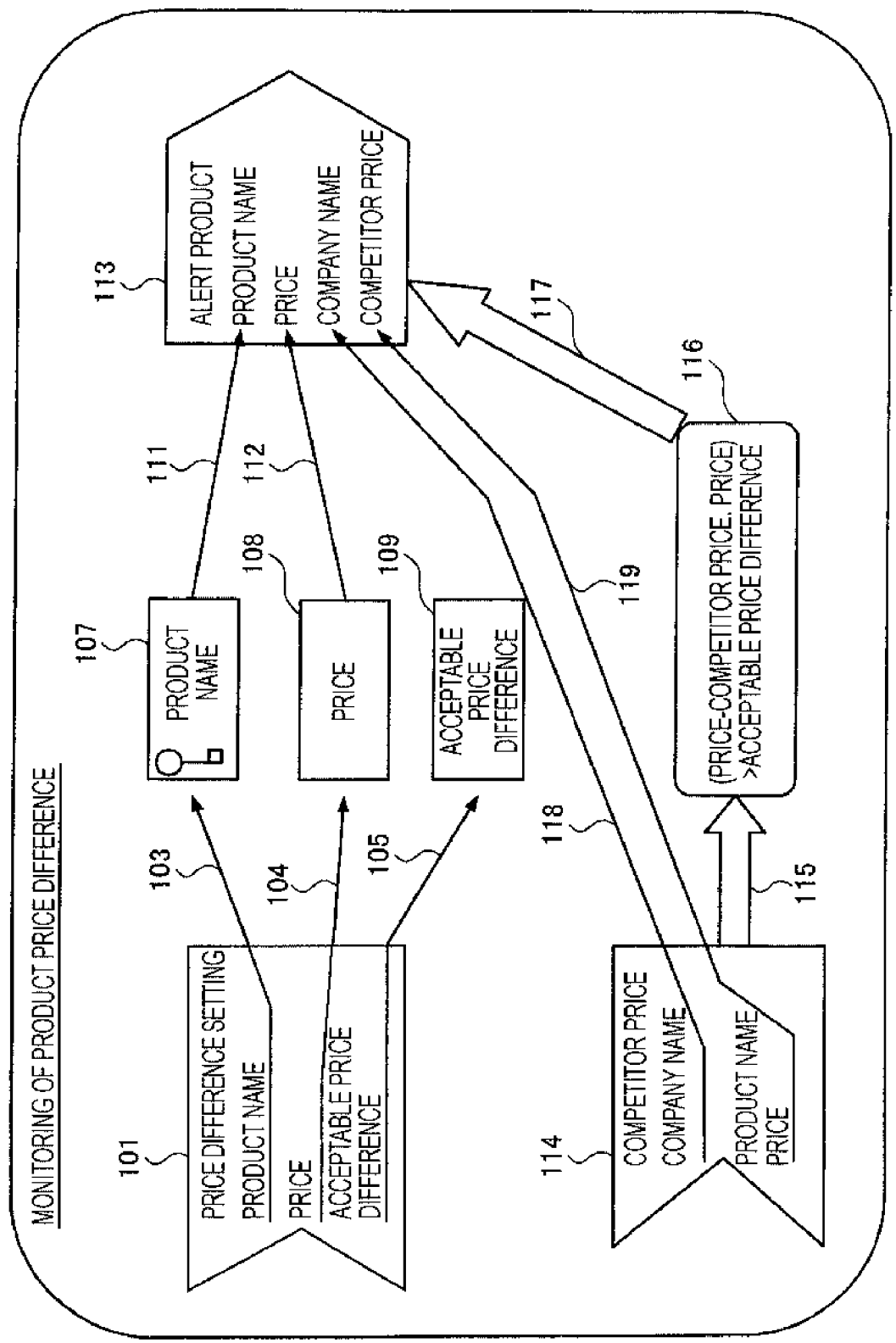
FIG. 2 depicts an exemplary design model of an application to be converted in the embodiment of the invention.

FIG. 2 illustrates a design model representing the processing of an application developed for a mass merchandiser chain. At each of its branches nationwide, this application monitors the competitors' prices of strategically important products and sends an alert to an administrative department at headquarters if a difference between the company's price and its competitor's price exceeds a threshold value. The application described here as an example is an application that realizes a function viewed as a single meaningful unit in a service oriented architecture (SOA). This application has an input interface for receiving data from another application and an output interface for sending data to another application. An application from or to which data is to be received or sent may be any application that supports this input or output interface.

Specifically, first, an input interface 101 (price difference setting) receives values of "product name", "price", and "acceptable price difference" from outside. Then, as indicated by arrows 103, 104, and 105, these values are assigned to a key variable 107 (product name), a variable 108 (price), a variable 109 (acceptable price difference), respectively. That is, for each product, its price and "acceptable price difference" serving as a threshold value for determining whether an alert should be issued are set.

Next, an input interface 114 (competitor price) receives values of "company name", "product name", and "price" from outside. Then, as indicated by a wide arrow 115, it is determined whether a conditional expression 116, "(price-competitor price. price>acceptable price difference)", is satisfied. Here, the conditional expression 116 expresses the condition that the difference between the value of the variable 108 (price) and the value of "price" received by the input interface 114 (competitor price) exceeds the value of the variable 109 (acceptable price difference). If it is determined that the conditional expression 116 is satisfied, the control proceeds to the processing of sending values to an output interface 113 (alert product) as indicated by a wide arrow 117. That is, as indicated by arrows 111 and 112, the values of the key variable 107 (product name) and variable 108 (price) are sent to the output interface 113 (alert product). At the same time, as indicated by arrows 118 and 119, the values of "company name", "product name", and "price" received by the input interface 114 (competitor price) are also sent to the output interface 113 (alert product). If, for example, an application for sending e-mail massages to the administrative department at headquarters is connected downstream of the output interface 113 (alert product), it is possible to notify the administrative department at headquarters of the name of a product and a competitor's name if a difference between the company's price and competitor's price of the product exceeds a threshold value.

After some time, a branch may have a need to monitor a strategically important product using the branch's own acceptable price difference, in view of the characteristics of its own sales environment. In such a case, it is necessary to modify the application such that the variable 109 (acceptable price difference) has a value for each branch. In this embodiment, the application is not directly modified. In other words, first, a design model is modified only by placing an annotation object (hereinafter simply referred to as "annotation") in the design model. Afterwards, the application can be easily modified by automatically generating an application on the basis of the modified design model.

Figure 3:
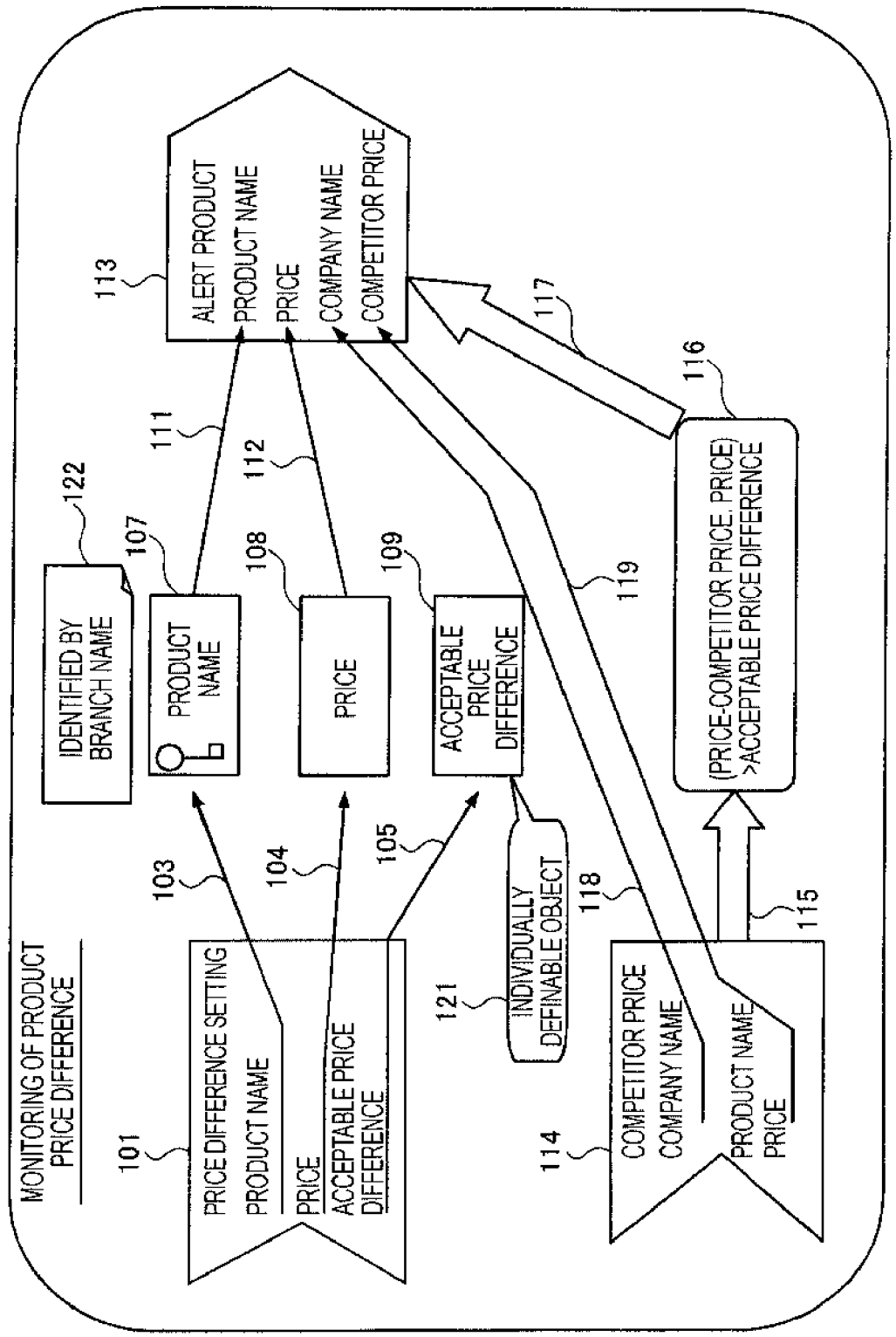
FIG. 3 depicts a state of an exemplary design model when conversion of an application is instructed in embodiment's of the invention.

FIG. 3 illustrates a state of a design model when a modification of an application is instructed. First, an annotation 121 specifies an object (hereinafter referred to as "individually definable object") that is to be made cope with an individual situation. In this example, the variable 109 (acceptable price difference) is specified as an individually definable object, since individual instances are created for the variable 109 (acceptable price difference). A key (hereinafter referred to as "identification key") for identifying each individual situation is specified by an annotation 122. In this example, a branch name is added as a key, since it is necessary to identify an instance for each branch.

Figure 4:
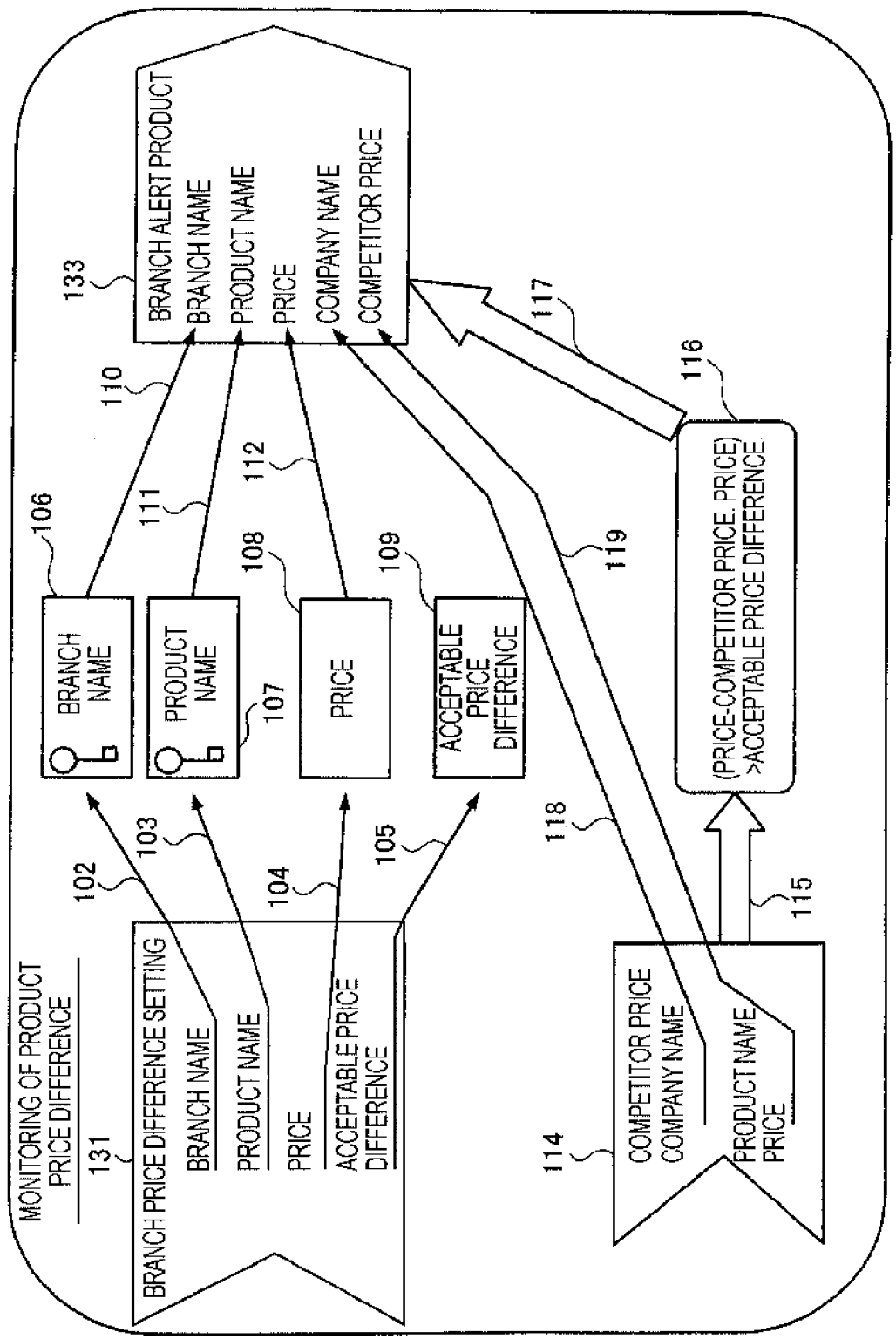
FIG. 4 depicts an exemplary design model after the conversion of the application.

When conversion of the design model is instructed in this state, this design model is converted to a new design model that can be individually used. FIG. 4 illustrates a design model resulting from the conversion. A key variable 106 (branch name) is provided in this design model. Furthermore, the input interface 101 (price difference setting) is replaced with an input interface 131 (branch price difference setting). The input interface 131 (branch price difference setting) receives a value of "branch name" from outside. Then, this value is assigned to the key variable 106 (branch name) as indicated by an arrow 102. Moreover, the output interface 113 (alert product) is replaced with an output interface 133 (branch alert product). Subsequently, as indicated by an arrow 110, the value of the key variable 106 (branch name) is passed to the output interface 133 (branch alert product). The remaining values and variables are the same as that of the design model before the conversion.

Figure 5:
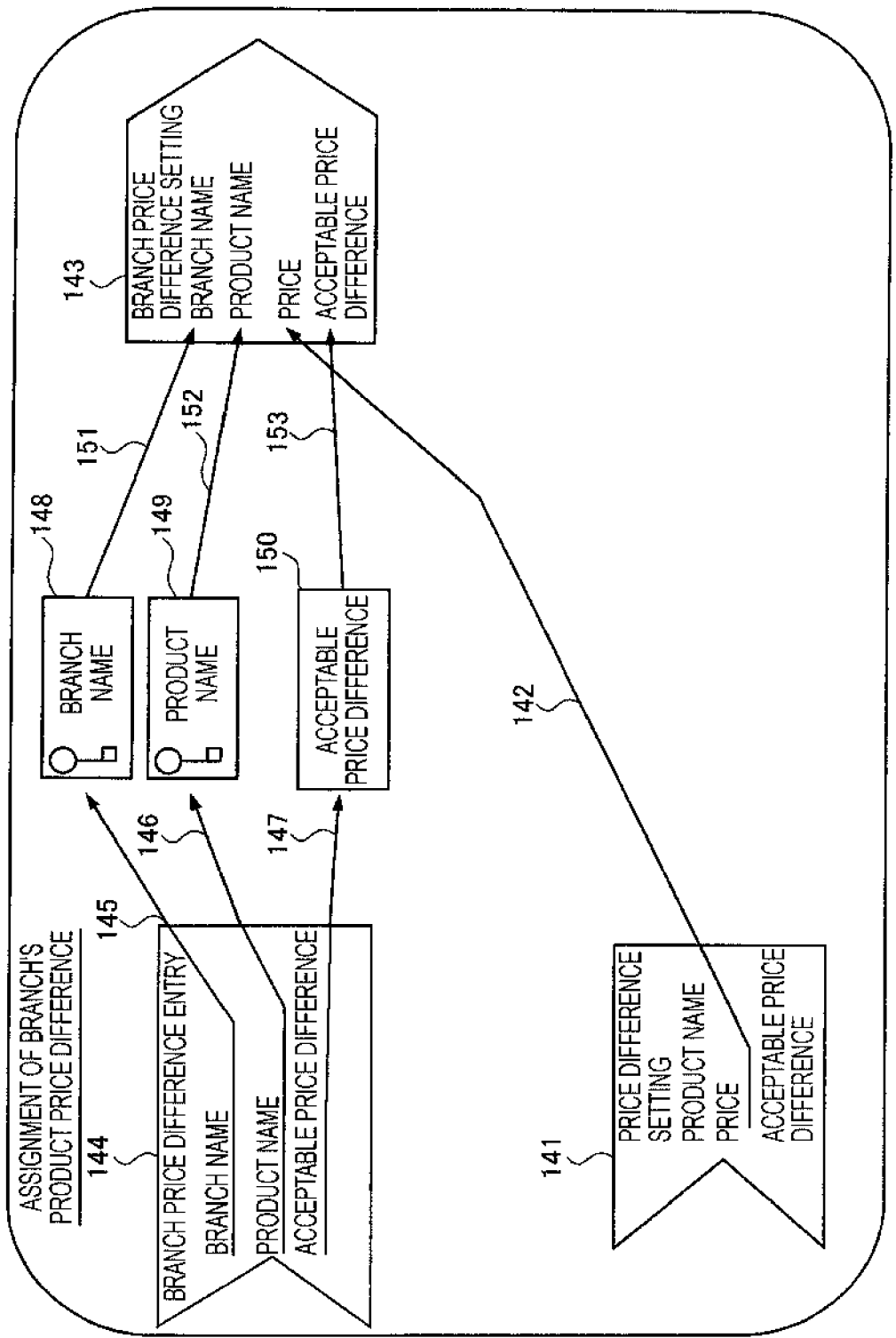
FIG. 5 depicts an exemplary design model after the conversion of the application.

FIG. 5 illustrates the new design model created. In this new model, an input interface 141 (price difference setting) receives values of "product name", "price", and "acceptable price difference" from outside. This input interface 141 (price difference setting) is equivalent to the input interface 101 (price difference setting) in the design model before conversion illustrated in FIG. 1.

Simultaneously, an input interface 144 (branch price difference entry) receives values of "branch name", "product name", and "acceptable price difference" from outside. As indicated by arrows 145, 146, and 147, these values are assigned to a key variable 148 (branch name), a key variable 149 (product name), and a variable 150 (acceptable price difference), respectively. Subsequently, as indicated by arrows 151, 152, and 153, the values of the key variable 148 (branch name), key variable 149 (product name), and variable 150 (acceptable price difference) are passed to an output interface 143 (branch price difference setting). Furthermore, as indicated by an arrow 142, the value of "price" received by the input interface 141 (price difference setting) from outside is passed to the output interface 143 (branch price difference setting). Specifically, a price and "acceptable price difference" which serves as a threshold value for determining whether an alert should be issued are set for each product and individualized by "branch name", "product name", and "acceptable price difference" passed from the new input interface 144 (branch price difference entry).

In this example, by performing two processing steps described below, a design model can be used as a template, which enables the use of an application according to the individual situation. The two processing steps are as follows:

1. Input Side

The name of an original input interface which passes a value to a variable specified as an individually definable object is changed to create a new input interface. Then, an identification key for identifying each individual situation is added to the new input interface. Also, information input from the original input interface is intercepted, individual information is added, and a model for individual control (i.e., new model) for calling the new input interface is created.

2. Output Side

The name of an original output interface is changed to create a new output interface. Then, an identification key for identifying each individual situation is added to the new output interface.

Hereinafter, each symbol appearing in a design model and representing each element that constitutes an application will be referred to as "model element". Here, "element" is a meaningful unit of an application. Examples of "element" include an input interface, an output interface, a variable, an assignment expression, a conditional expression, and a controlling expression. Therefore, model elements in a design model are a symbol representing an input interface, a symbol representing an output interface, a symbol representing a variable (including a special symbol representing a key variable), an arrow corresponding to an assignment expression, a symbol representing a conditional expression, and a wide arrow representing a controlling expression.

Figure 6:
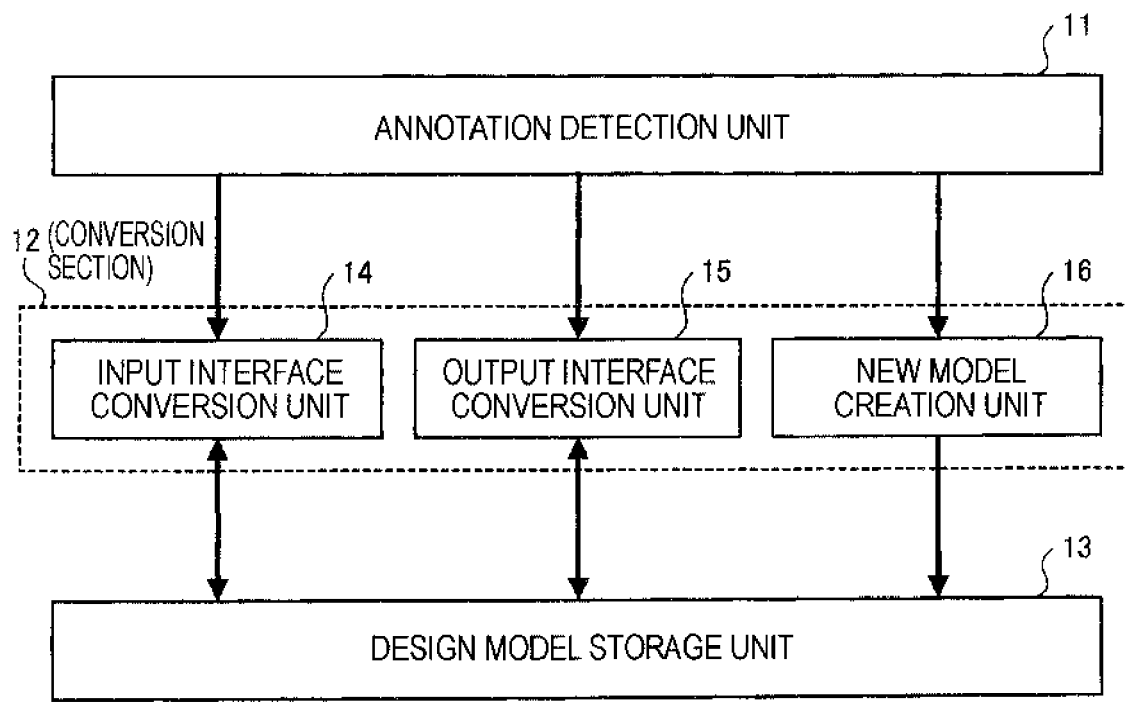
FIG. 6 depicts a block diagram illustrating a functional configuration of an application conversion apparatus according to an embodiment of the invention.

FIG. 6 is a block diagram illustrating a functional configuration of an application conversion apparatus which performs application conversion illustrated in FIGS. 2 to 5. As illustrated, this application conversion apparatus includes an annotation detection unit 11, a conversion section 12, and a design model storage unit 13. The conversion section 12 includes an input interface conversion unit 14, an output interface conversion unit 15, and a new model creation unit 16. The annotation detection unit 11 detects the location of an annotation on a display unit, which is a portion of the display mechanism 10*d* (see FIG. 1). The conversion section 12 converts a design model on the basis of the detected location of the annotation. The design model storage unit 13 stores design models before and after conversion. Of the components included in the conversion section 12, the input interface conversion unit 14 converts an input interface in a design model, the output interface conversion unit 15 converts an output interface in a design model, and the new model creation unit 16 creates a new model to be added.

In this embodiment, a design model is converted according to the procedure described below. The following operation is performed on an input interface which passes a value to a variable specified as an individually definable object:

1-1. If an existing input interface is an object on which the operation is to be performed, the name of this input interface (original input interface) is changed to create a different input interface (new input interface). If a new input interface is an object on which the operation is to be performed, a model element representing the input interface is added.

1-2. All model elements that refer to the original input interface are made to refer to the new input interface created in 1-1.

1-3. An input item serving as a source from which a value is input to a variable specified as an identification key is added to the new input interface.

1-4. A model element (arrow) for assigning a value of this input item to the variable specified as an identification key is added.

The following operation is performed on an output interface:

2-1. If an existing output interface is an object on which the operation is to be performed, the name of this output interface (original output interface) is changed to create a different output interface (new output interface). If a new output interface is an object on which the operation is to be performed, a model element representing the output interface is added.

2-2. All model elements that refer to the original output interface are made to refer to the new output interface created in 2-1.

2-3. An output item serving as a destination to which a value is output from a variable specified as an identification key is added to the new output interface.

2-4. A model element (arrow) for assigning a value of the variable specified as an identification key to this output item is added.

On the basis of the modified input interface information, a design model (new model) for individual control is created as follows 3-1. A model element corresponding to the original input interface and a model element corresponding to the output interface for calling the new input interface are created.

3-2. A model element (arrow) for assigning a value of an input item of the input interface to an output item of the output interface is created.

3-3. A model element (arrow) for assigning specified individual information to an output item of the output interface is created.

When a user places an annotation on the display unit as illustrated in FIG. 3, the annotation detection unit 11 recognizes the content and object that are specified by the annotation. First, the recognition of content specified by an annotation will be described. In this embodiment, an annotation may specify a variable as an individually definable object or as an identification key. Therefore, the shape of an annotation may be varied according to the content specified by the annotation. In this case, correspondence information which defines the correspondence between the shape of an annotation and content specified by the annotation is stored in advance in the storage unit. Subsequently, when an annotation is placed, the annotation detection unit 11 refers to this correspondence information to recognize the content specified by the annotation. A different attribute, such as color, of an annotation may be varied according to the content specified by the annotation.

The annotation detection unit 11 identifies the location of an annotation to recognize an object, that is, a variable specified by the annotation. For example, if the relationship between the location of an annotation and that of a model element representing a variable satisfies a predetermined condition, the annotation detection unit 11 determines that this variable is an object specified by the annotation. In FIG. 3, an annotation which specifies a variable as an individually definable object is in the shape of a balloon. That is, the variable to which the tip of the balloon points is the object. Alternatively, if the relationship between the location of an annotation and that of a model element representing a variable does not satisfy a predetermined condition, the annotation detection unit 11 determines that a variable to be newly added will be an object. In this case, the name of a variable to be newly added can be automatically determined by the application conversion apparatus if, as illustrated in FIG. 3, the name is contained in an annotation as text data.

Upon recognition of the content and object specified by the annotation, the operation of the conversion section 12 starts. The operation of the conversion section 12 involves "input interface conversion" performed by the input interface conversion unit 14, "output interface conversion" performed by the output interface conversion unit 15, and "new model creation" performed by the new model creation unit 16, which are separately described below.

Figure 7:
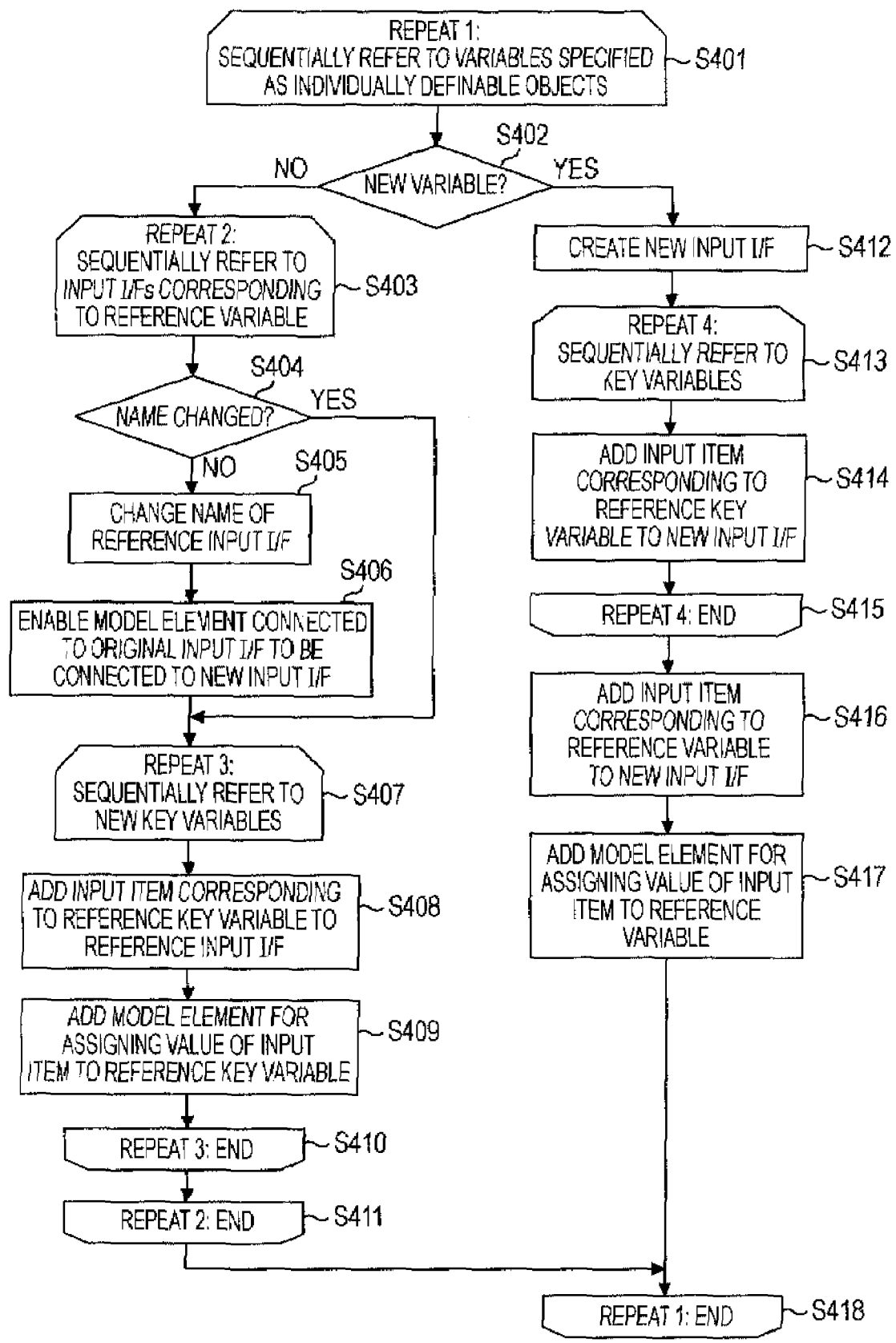
FIG. 7 depicts a flowchart illustrating an operation of an input interface conversion unit according to an embodiment of the invention.

Input interface conversion—FIG. 7 is a flowchart illustrating an operation performed when the input interface conversion unit 14 converts an input interface. In FIG. 7, the term "interface" is abbreviated as "I/F" for convenience of illustration. At the same time, a variable, a key variable, and an input interface that are currently being referenced in a repeat operation are simply described as "reference variable", "reference key variable", and "reference input I/F", respectively.

Upon the start of the operation, the input interface conversion unit 14 sequentially refers to all variables specified as individually definable objects and repeats steps S402 through S417 (steps S401 through S418: Repeat 1). In Repeat 1, the input interface conversion unit 14 performs the following processing with respect to a currently referenced variable. In the example of FIG. 3, the following processing is performed with respect to the variable 109 (acceptable price difference), which is specified as an individually definable object. Specifically, the input interface conversion unit 14 determines whether a currently referenced variable is a newly added variable (step S402). In the example of FIG. 3, since the variable 109 (acceptable price difference) already exists in the design model, the input interface conversion unit 14 determines that the currently referenced variable is not a newly added variable. While not shown, if an annotation which specifies the addition of a new variable, such as "price difference setting date", is given, the input interface conversion unit 14 determines that the currently referenced variable is a newly added variable.

A case where the input interface conversion unit 14 determines in step S402 that the variable is not a newly added variable is described first. In the example of FIG. 3, the following processing is performed with respect to the variable 109 (acceptable price difference). In this case, the input interface conversion unit 14 sequentially refers to all input interfaces associated with the currently referenced variable and repeats steps S404 through S410 (steps S403 through S411: Repeat 2). In Repeat 2, the input interface conversion unit 14 performs the following processing with respect to a currently referenced input interface. In the example of FIG. 3, the input interface conversion unit 14 performs the following processing with respect to the input interface 101 (price difference setting), which is associated with the variable 109 (acceptable price difference).

First, the input interface conversion unit 14 determines whether the name of the currently referenced input interface has been changed (step S404). If it is determined that the name of the input interface has not been changed (NO in step S404), the name of the input interface (original input interface) is changed to create a different input interface (new input interface) (step S405). In the example of FIGS. 3 and 4, the input interface 101 (price difference setting) is replaced with the input interface 131 (branch price difference setting). Next, model elements that refer to the name of the original input interface are changed to refer to the name of the new input interface (step S406). In the example of FIGS. 3 and 4, the arrows pointing to the key variable 107 (product name), variable 108 (price), and variable 109 (acceptable price difference) that refer to the input interface 101 (price difference setting) are changed to refer to the input interface 131 (branch price difference setting). Alternatively, if it is determined that the name of the input interface has been changed (YES in step S404), the processing proceeds to step S407 without changing the name.

Then, the input interface conversion unit 14 sequentially refers to newly added key variables and repeats steps S408 and S409 (steps S407 through S410: Repeat 3). In Repeat 3, the input interface conversion unit 14 performs the following processing with respect to a currently referenced key variable. In the example of FIG. 3, since an annotation "identified by branch name" is provided, the key variable 106 (branch name) is newly added (see FIG. 4) and the following processing is performed for this key variable.

First, an input item corresponding to the currently referenced key variable is added to the currently referenced input interface, that is, to the new input interface created in step S405 by changing the interface name (step S408). In the example of FIG. 4, an input item "branch name" is newly provided in the input interface 131 (branch price difference setting). Then, a model element for assigning a value held by the input item to the currently referenced key variable is added (step S409). In the example of FIG. 4, the arrow 102 from the input item "branch name" to the key variable 106 (branch name) is provided.

Next, there will be described a case where the input interface conversion unit 14 determines in step S402 that the variable is a newly added variable. In this case, the input interface conversion unit 14 creates a new input interface (step S412). For example, if it is specified that "price difference setting date" is to be newly added, the input interface conversion unit 14 creates an input interface for the entry of "price difference setting date". Then, the input interface conversion unit 14 sequentially refers to all key variables and repeats step S404 (steps S413 through S415: Repeat 4). In Repeat 4, the input interface conversion unit 14 performs the following processing with respect to the currently referenced key variable.

An input item corresponding to a currently referenced key variable is added to the input interface newly created in step S412 (step S414). For example, in FIG. 3, if the new variable "price difference setting date", instead of the existing variable "acceptable price difference", is specified as an individually definable object, input items "branch name" and "product name" corresponding to the key variable 106 (branch name) and key variable 107 (product name), respectively, are added to the new input interface. Subsequently, the input interface conversion unit 14 adds, to the input interface newly created in step S412, an input item corresponding to a currently referenced variable (step S416). Then, the input interface conversion unit 14 adds a model element for assigning a value held by the input item to the currently referenced variable (step S417). For example, in FIG. 3, if the new variable "price difference setting date", instead of the existing variable "acceptable price difference", is specified as an individually definable object, the input interface conversion unit 14 adds, to the new input interface, an input item "price difference setting date" corresponding to the variable "price difference setting date". Also, the input interface conversion unit 14 adds an arrow from the input item "price difference setting date" to the variable "price difference setting date". Thus, the input interface conversion processing performed by the input interface conversion unit 14 is completed.

Figure 8:
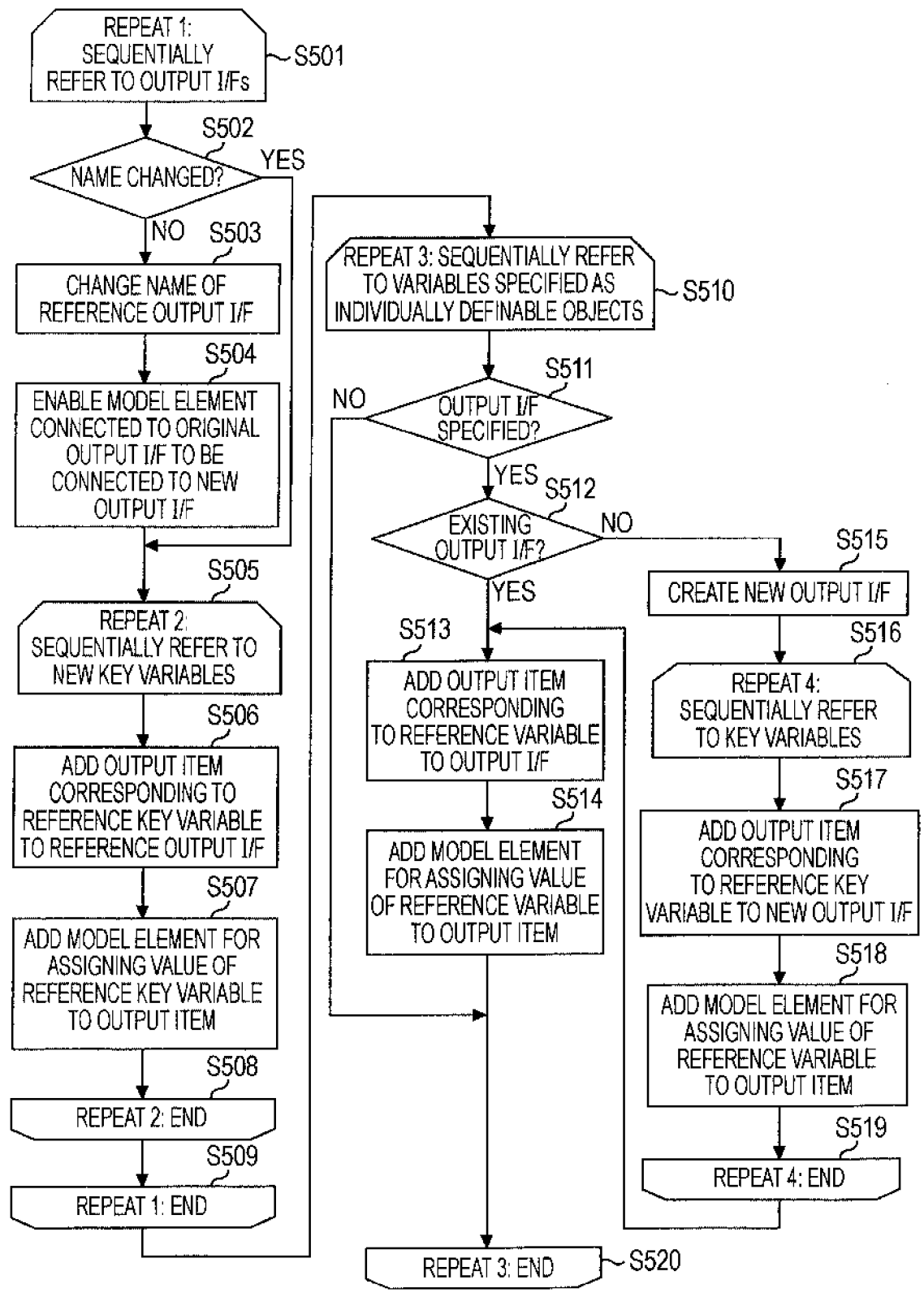
FIG. 8 depicts a flowchart illustrating an operation of an output interface conversion unit according to an embodiment of the invention.

Output interface conversion—FIG. 8 is a flowchart illustrating an operation performed when the output interface conversion unit 15 converts an output interface. In FIG. 8, again, the term "interface" is abbreviated as "I/F" for convenience of illustration. At the same time, a variable, a key variable, and an output interface that are currently being referenced in a repeat operation are simply described as "reference variable", "reference key variable", and "reference output I/F", respectively.

Upon start of operation, the output interface conversion unit 15 sequentially refers to all output interfaces and repeats steps S502 through S508 (steps S501 through S509: Repeat 1). In Repeat 1, the output interface conversion unit 15 performs the following processing with respect to a currently referenced output interface. In the example of FIG. 3, the output interface conversion unit 15 performs the following processing with respect to the output interface 113 (alert product).

First, the output interface conversion unit 15 determines whether the name of the currently referenced output interface has been changed (step S502). If it is determined that the name of the output interface has not been changed (NO in step S502), the name of the output interface (original output interface) is changed to create a different output interface (new output interface) (step S503). In the example of FIGS. 3 and 4, the output interface 113 (alert product) is replaced with the output interface 133 (branch alert product). Then, model elements that refer to the name of the original output interface are changed to refer to the name of the new output interface (step S504). In the example of FIGS. 3 and 4, the arrows from the key variable 107 (product name) and variable 108 (price) and the arrows from the input items "company name" and "price" in the input interface 114 (competitor price) that refer to the output interface 113 (alert product) are changed to refer to the output interface 133 (branch alert product). Alternatively, if it is determined that the name of the output interface has been changed (YES in step S502), the processing proceeds to step S505 without changing the name.

Then, the output interface conversion unit 15 sequentially refers to newly added key variables and repeats steps S506 and S507 (steps S505 through S508: Repeat 2). In Repeat 2, the output interface conversion unit 15 performs the following processing with respect to a currently referenced key variable. In the example of FIG. 3, since an annotation "identified by branch name" is provided, the following processing is performed with respect to the key variable 106 (branch name) (see FIG. 4). First, an output item corresponding to the currently referenced key variable is added to the currently referenced output interface, that is, to the new output interface created in step S503 by changing the interface name (step S506). In the example of FIG. 4, an output item "branch name" is newly provided in the output interface 133 (branch alert product). Then, a model element for assigning a value held by the currently referenced key variable to the output item is added (step S507). In the example of FIG. 4, the arrow 110 from the key variable 106 (branch name) to the output item "branch name" is provided.

Next, the output interface conversion unit 15 sequentially refers to all variables specified as individually definable objects and repeats steps S511 through S519 (steps S510 through S520: Repeat 3). In Repeat 3, the output interface conversion unit 15 performs the following processing with respect to a currently referenced variable. In the example of FIG. 3, the following processing is performed with respect to the variable 109 (acceptable price difference), which is specified as an individually definable object. Specifically, the output interface conversion unit 15 determines whether an output interface is specified for the currently referenced variable (step S511). The foregoing description refers to an annotation which can be used to specify a variable as an individually definable object or as an identification key. Here, an output interface for the variable can be specified using an annotation. If it is determined that an output interface is not specified (NO in step S511), the processing proceeds to step S520 and ends. In the example of FIG. 3, an output interface is not specified for the variable 109 (acceptable price difference), which is specified as an individually definable object. Therefore, the processing ends here.

Alternatively, if an output interface is specified (YES in step S511), the output interface conversion unit 15 determines whether the specified output interface is an existing output interface (step S512). For example, if the output interface 113 (alert product) is specified as an output interface for a variable "price difference setting date" mentioned as an example in the foregoing description about input interface conversion, the determination in step S512 is "YES". On the other hand, if an output interface not existing in the design model is specified as an output interface for the variable "price difference setting date", the determination in step S512 is "NO". Specifying such a new output interface is particularly useful when a plurality of variables are added. For example, if some variables as well as the variable "price difference setting date" are added, a combination of values held by these variables can be passed to another application through the same output interface.

If it is determined that the specified output interface is an existing output interface (YES in step S512), an output item corresponding to the currently referenced variable is added to this output interface (step S513). Then, a model element for assigning, to this output item, a value held by the currently referenced variable is added (step S514).

Conversely, if it is determined that the specified output interface is not an existing output interface (NO in step S512), a new output interface is created (step S515). Then, the output interface conversion unit 15 sequentially refers to all key variables and repeats steps S517 and S518 (steps S516 through S519: Repeat 4). In Repeat 4, the output interface conversion unit 15 performs the following processing with respect to a currently referenced key variable. First, an output item corresponding to the currently referenced key variable is added to the output interface created in step S515 (step S517). Then, a model element for assigning, to this output item, a value held by the currently referenced key variable is added (step S518). For example, in FIG. 3, if an output interface not existing in the design model is specified as an output interface for the variable specified as an individually definable object, output items "branch name" and "product name" corresponding to the key variable 106 (branch name) and key variable 107 (product name), respectively, are added to the new output interface. Then, the same processing as in the case where the specified output interface is an existing output interface is performed (steps S513 and S514). Thus, the output interface conversion processing performed by the output interface conversion unit 15 is completed.

New model creation—FIG. 9 is a flowchart illustrating an operation performed when the new model creation unit 16 creates a new model (interface conversion model). In FIG. 9, again, the term "interface" is abbreviated as "I/F" for convenience of illustration. At the same time, a variable, a key variable, an input interface, and an output item that are currently being referenced in a repeat operation are simply described as "reference variable", "reference key variable", "reference input I/F", and "reference output item", respectively.

Upon start of operation, the new model creation unit 16 sequentially refers to input interfaces obtained by the input interface conversion processing of FIG. 7 and repeats steps S602 through S615 (steps S601 through S616: Repeat 1). In Repeat 1, the new model creation unit 16 performs the following processing with respect to a currently referenced input interface. In the example of FIG. 4, the new model creation unit 16 performs the following processing with respect to the input interface 131 (branch price difference setting) created by the foregoing input interface conversion.

First, the new model creation unit 16 creates an original input interface equivalent to the input interface from which the currently referenced input interface is derived (step S602). In the example of FIGS. 3 and 4, the input interface 131 (branch price difference setting) is derived from the input interface 101 (price difference setting). Therefore, the new model creation unit 16 creates the input interface 141 (price difference setting) equivalent to the input interface 101 (price difference setting) as illustrated in FIG. 5. Furthermore, the new model creation unit 16 creates an output interface corresponding to the currently referenced input interface (step S603). Here, all input items included in the currently referenced input interface are included as output items in the output interface created in step S603. In the example of FIG. 5, the output interface 143 (branch price difference setting) corresponding to the input interface 131 (branch price difference setting) of FIG. 4 is created.

Next, the new model creation unit 16 sequentially refers to the output items included in the output interface created in step S603 and repeats steps S605 through S614 (steps S604 through S615: Repeat 2). In Repeat 2, the new model creation unit 16 performs the following processing with respect to a currently referenced output item. In the example of FIG. 5, the following processing is performed with respect to the output items "branch name", "product name", "price", and "acceptable price difference" included in the output interface 143 (branch price difference setting).

First, the new model creation unit 16 determines whether an input item corresponding to the currently referenced output item exists in the original input interface created (step S605). If such an input item does not exist in the original input interface (NO in step S605), the new model creation unit 16 creates a variable corresponding to the currently referenced output item (step S606). Then, a model element for assigning a value held by the created variable to the currently referenced output item is added (step S607). In the example of FIG. 5, among the output items "branch name", "product name", "price", and "acceptable price difference", only the output item "branch name" does not exist in the input interface 141 (price difference setting). Therefore, the key variable 148 (branch name) and the arrow 151 pointing to the output item "branch name" are created.

Alternatively, if an input item corresponding to the currently referenced output item exists in the original input interface (YES in step S605), the new model creation unit 16 determines whether the currently referenced output item corresponds to a key variable (step S608).

If it is determined that the output item corresponds to a key variable (YES in step S608), the new model creation unit 16 creates the key variable (step S609). Then, a model element for assigning a value held by the created key variable to the currently referenced output item is added (step S610). In the example of FIG. 5, among the output items "product name", "price", and "acceptable price difference" that remain after the exclusion of the output item "branch name", only the output item "product name" corresponds to a key variable. Therefore, the key variable 149 (product name) and the arrow 152 pointing to the output item "product name" are created.

If it is determined that the currently referenced output item does not correspond to a key variable (NO in step S608), the new model creation unit 16 further determines whether this output item corresponds to a variable specified as an individually definable object (step S611). If it is determined that this output item does not correspond to a variable specified as an individually definable object (NO in step S611), a model element for assigning a value held by an input item included in the input interface created in step S602 to an output item included in the output interface created in step S603 is added (step S612). In the example of FIG. 5, of the output items "price" and "acceptable price difference" that remain after the exclusion of the output items "branch name" and "product name", only the output item "price" does not correspond to a variable specified as an individually definable object. Therefore, the arrow 142 extending from the input item "price" in the input interface 141 (price difference setting) to the output item "price" in the output interface 143 (branch price difference setting) is created.

Alternatively, if it is determined that the currently referenced output item corresponds to a variable specified as an individually definable object (YES in step S611), the new model creation unit 16 creates a variable corresponding to this output item (step S613). Then, a model element for assigning a value held by this variable to the output item is added (step S614). In the example of FIG. 5, of the output items "price" and "acceptable price difference" that remain after the exclusion of the output items "branch name" and "product name", only the output item "acceptable price difference" corresponds to a variable specified as an individually definable object. Therefore, the variable 150 (acceptable price difference) and the arrow 153 extending from the variable 150 (acceptable price difference) to the output item "acceptable price difference" are created.

Subsequently, the new model creation unit 16 creates an input interface (individual input interface) for receiving individual information (step S617). In the example of FIG. 5, the input interface 144 (branch price difference entry) is created. Then, the new model creation unit 16 sequentially refers to all variables including the created key variables and repeats steps S619 and S620 (steps S618 through S621: Repeat 3). In Repeat 3, the new model creation unit 16 performs the following processing with respect to a currently referenced variable. In the example of FIG. 5, the following processing is performed with respect to the key variable 148 (branch name), key variable 149 (product name), and variable 150 (allowable price difference).

First, an input item corresponding to a currently referenced variable is added to the individual input interface created in step S617 (step S619). Then, a model element for assigning a value held by this input item to the currently referenced variable is added (step S620). In the example of FIG. 5, the input items "branch name", "product name", and "acceptable price difference" are added to the input interface 144 (branch price difference entry). Additionally, the arrow 145 from the input item "branch name" to the key variable 148 (branch name), the arrow 146 from the input item "product name" to the key variable 149 (product name), and the arrow 147 from the input item "acceptable price difference" to the variable 150 (acceptable price difference) are created. Thus, the new model creation processing performed by the new model creation unit 16 is completed.

Next, data processing for realizing input interface conversion, output interface conversion, and new model creation performed by the conversion section 12 will be described in detail. In this embodiment, the design model storage unit 13 (see FIG. 6) stores data (hereinafter referred to as "management data") for managing a design model, which is converted when the conversion section 12 updates this management data.

Management data in initial state—FIG. 10 shows management data in a state before the foregoing application conversion illustrated in FIGS. 7 through 9 is performed. FIG. 10(*a*) is a table (hereinafter referred to as "interface management table") for managing interfaces among other model elements. In the present embodiment, an interface management table contains columns "interface name", "type", "item 1", "item 2", . . . , and "item 5". The "interface name" column stores the names of interfaces. The "type" column stores information indicating whether the corresponding interface is an input interface or an output interface. In FIG. 10(*a*), "I" is stored for an input interface and "O" is stored for an output interface. The "item 1", "item 2", . . . , and "item 5" columns each store an input item or an output item included in the corresponding interface. While five items are shown for each interface for convenience of illustration, the number of items is not limited to this.

FIG. 10(*a*), which shows information before application conversion is performed, reflects the state of interfaces illustrated in FIG. 2. In FIG. 10(*a*), row No. 1 manages the input interface 101 (price difference setting) and shows that this input interface contains the input items "product name", "price", and "acceptable price difference". Row No. 2 manages the input interface 114 (competitor price) and shows that this input interface contains the input items "company name", "product name", and "price". Row No. 3 manages the output interface 113 (alert product) and shows that this output interface contains the output items "product name", "price", "company name", and "competitor price".

FIG. 10(*b*) is a table (hereinafter referred to as "variable management table") for managing variables among other model elements. In the present embodiment, a variable management table contains columns "variable name" and "KEY". The "variable name" column stores the names of variables. The "key" column stores information indicating whether the corresponding variable is a key variable. In FIG. 10(*b*), "O" is stored for a key variable, while a field is left blank if the corresponding variable is not a key variable.

A specific description will now be given. FIG. 10(*b*), which shows information before application conversion is performed, reflects the state of variables illustrated in FIG. 2. In FIG. 10(*b*), row No. 1 manages the key variable 107 (product name) and shows that this variable is a key variable. Row No. 2 manages the variable 108 (price) and shows that this variable is not a key variable. Likewise, row No. 3 manages the variable 109 (acceptable price difference) and shows that this variable is not a key variable.

FIG. 10(*c*) is a table (hereinafter referred to as "connection management table") for managing connection relationships represented by arrows, among other model elements. In the present embodiment, a connection management table contains columns "source type", "source name", "destination type", and "destination name". The "source type" and "source name" columns store the types and names of model elements that are sources from which arrows originate. For example, when "interface" is stored in the "source type" column, an input item included in the source is stored in the "source name" column in the form of "(input interface name) .(input item name)". The "destination type" and "destination name" columns store the types and names of model elements that are destinations to which arrows point. For example, when "interface" is stored in the "destination type" column, an output item included in the destination is stored in the "destination name" column in the form of "(output interface name).(output item name)".

A specific description will now be given. FIG. 10(*c*), which shows information before application conversion is performed, reflects the state of arrows illustrated in FIG. 2. In FIG. 10(*c*), row No. 1 manages the arrow 103 extending from the input item "product name" in the input interface 101 (price difference setting) to the key variable 107 (product name). Row No. 2 manages the arrow 104 extending from the input item "price" in the input interface 101 (price difference setting) to the variable 108 (price). Row No. 3 manages the arrow 105 extending from the input item "acceptable price difference" to the variable 109 (acceptable price difference). Additionally, row No. 4 manages the arrow 111 extending from the key variable 107 (product name) to the output item "product name" in the output interface 113 (alert product). Row No. 5 manages the arrow 112 extending from the variable 108 (price) to the output item "price" in the output interface 113 (alert product).

Furthermore, row No. 6 manages the arrow 118 extending from the input item "company name" in the input interface 114 (competitor price) to the output item "company name" in the output interface 113 (alert product). Row No. 7 manages the arrow 119 extending from the input item "price" in the input interface 114 (competitor price) to the output item "competitor price" in the output interface 113 (alert product).

Management data updates corresponding to input interface conversion and output interface conversion—FIG. 11 shows management data resulting from input interface conversion and output interface conversion illustrated in FIGS. 7 and 8, respectively. Before this input and output conversion processing, the management data shown in FIG. 10 is copied to a temporary memory and updated therein. In other words, a copy of the management data is converted to the management data shown in FIG. 11 while the state of FIG. 10 is maintained.

In step S401 of FIG. 7, the input interface conversion unit 14 identifies the variable "acceptable price difference" as an individually definable object, and determines in step S402 that the variable "acceptable price difference" is not a newly added variable. In step S403, according to the following procedure, the input interface conversion unit 14 refers to an input interface associated with the currently referenced variable. First, among rows in the connection management table stored in the temporary memory, the input interface conversion unit 14 identifies a row which contains "interface" in the "source type" column, "variable" in the "destination type" column, and "acceptable price difference" in the "destination name" column. Then, the input interface conversion unit 14 extracts the input interface name from the "source name" column in this row. In this example, the input interface conversion unit 14 identifies row No. 3 of FIG. 10(*c*) and extracts "price difference setting" as the input interface name.

Next, in step S404, the input interface conversion unit 14 determines, according to the following procedure, whether the input interface name has been changed. That is, the input interface conversion unit 14 determines whether, in the interface management table stored in the temporary memory, there is a row which contains the name of the currently referenced interface in the "interface name" column and also contains "I" in the "type" column. If there is such a row, the input interface conversion unit 14 determines in step S404 that the name of the input interface has not yet been changed. If such a row does not exist, the input interface conversion unit 14 determines in step S404 that the name of the input interface name has been changed. In this example, it is determined whether there is a row which contains "price difference setting" in the "interface name" column and also contains "I" in the "type" column.

If it is determined in step S404 that the name of the input interface has not yet been changed, the input interface conversion unit 14 changes the name of the input interface in step S405. That is, the input interface conversion unit 14 writes, in the interface management table stored in the temporary memory, a new input interface name to the "interface name" column. In this example, "price difference setting" is changed to "branch price difference setting" shown in row No. 1 of FIG. 11(a).

Next, in step S406, the input interface conversion unit 14 changes all model elements referring to the original input interface such that they refer to the new input interface. That is, in the connection management table stored in the temporary memory, if the name of the original input interface is stored in the "source name" column, the input interface conversion unit 14 changes this name to the name of the new input interface. In this example, "price difference setting" is changed to "branch price difference setting" shown in rows Nos. 2 through 4 of FIG. 11(c).

Next, in step S407, the input interface conversion unit 14 refers to the key variable "branch name". Then, in step S408, the input interface conversion unit 14 adds, to the currently referenced input interface, an input item corresponding to the currently referenced key variable, according to the following procedure. First, the input interface conversion unit 14 adds a row to the variable management table stored in the temporary memory. In this row, the input interface conversion unit 14 stores "branch name" and "O" in the "variable" column and the "key" column, respectively. This gives a variable management table shown in FIG. 11(b). At the same time, in the interface management table stored in the temporary memory, the input interface conversion unit 14 stores "branch name" in any one of the columns "item 1" through "item 5" in the row which manages the currently referenced input interface. In this example, "branch name" is stored in the "item 1" column as shown in row No. 1 of FIG. 11(a).

Subsequently, in step S409, the input interface conversion unit 14 adds a model element for assigning a value held by the input item to the key variable. That is, the input interface conversion unit 14 first adds a row to the connection management table stored in the temporary memory. Then, in the added row, the input interface conversion unit 14 stores "interface" in the "source type" column, stores the name of the input item added in step S408 in the "source name" column, stores "variable" in the "destination type" column, and stores the name of the currently referenced key variable in the "destination name" column. In this example, "branch price difference setting. branch name" is stored in the "source name" column and "branch name" is stored in the "destination name" column as shown in row No. 1 of FIG. 11(c).

Management data updates corresponding to output interface conversion illustrated in FIG. 8 can be described with reference to FIGS. 10 and 11. First, in step S501 of FIG. 8, the output interface conversion unit 15 refers to the output interface "alert product". Next, in step S502, the output interface conversion unit 15 determines, according to the following procedure, whether the output interface name has been changed. The output interface conversion unit 15 determines whether, in the interface management table stored in the temporary memory, there is a row which contains the name of the currently referenced interface in the "interface name" column and also contains "O" in the "type" column. If there is such a row, the output interface conversion unit 15 determines in step S502 that the name of the output interface has not yet been changed. If such a row does not exist, the output interface conversion unit 15 determines in step S502 that the name of the output interface name has been changed. In this example, it is determined whether there is a row which contains "alert product" in the "interface name" column and also contains "O" in the "type" column.

If it is determined in step S502 that the name of the output interface has not yet been changed, the output interface conversion unit 15 changes the name of the output interface in step S503. That is, the output interface conversion unit 15 writes, in the interface management table stored in the temporary memory, a new output interface name to the "interface name" column. In this example, "alert product" is changed to "branch alert product" shown in row No. 3 of FIG. 11(a).

Next, in step S504, the output interface conversion unit 15 changes all model elements referring to the original output interface such that they refer to the new output interface. That is, in the connection management table stored in the temporary memory, if the name of the original output interface is stored in the "destination name" column, the output interface conversion unit 15 changes this name to the name of the new output interface. In this example, "alert product" is changed to "branch alert product" shown in rows Nos. 6 through 9 of FIG. 11(c).

Subsequently, in step S505, the output interface conversion unit 15 refers to the key variable "branch name". Afterward, in step S506, the output interface conversion unit 15 adds, to the currently referenced output interface, an output item corresponding to the currently referenced key variable. Specifically, in the interface management table stored in the temporary memory, the output interface conversion unit 15 stores "branch name" in any one of the columns "item 1" through "item 5" in the row which manages the currently referenced output interface. In this example, "branch name" is stored in the "item 1" column as shown in row No. 3 of FIG. 11(a).

Next, in step S507, the output interface conversion unit 15 adds a model element for assigning a value held by the key variable to the output item. That is, first, the output interface conversion unit 15 adds a row to the connection management table stored in the temporary memory. Then, in the added row, the output interface conversion unit 15 stores "variable" in the "source type" column, stores the name of the currently referenced key variable in the "source name" column, stores "interface" in the "destination type" column, and stores the name of the output item added in step S506 in the "destination name" column. In this example, "branch name" is stored in the "source name" column and "branch alert product. branch name" is stored in the "destination name" column as shown in row No. 5 of FIG. 11(c).

Management data generation corresponding to new model creation—FIG. 12 shows management data resulting from new model creation illustrated in FIG. 9. In step S601 of FIG. 9, the new model creation unit 16 refers to an input interface that has been changed. Specifically, from the rows of FIG. 11(a), the new model creation unit 16 identifies a row which contains "I" in the "type" column and also contains, in the "interface name" column, a name different from that stored in the corresponding row of FIG. 10(a). In this example, the new model creation unit 16 identifies "branch price difference setting" in row No. 1 of FIG. 11(a).

Next, in step S602, the new model creation unit 16 creates an original input interface equivalent to the input interface from which the currently referenced input interface is derived. That is, first, from the rows of FIG. 10(a), the new model creation unit 16 identifies a row which corresponds to the row of FIG. 11(a) identified in step S601. The new model creation unit 16 then adds a row having the same content as that of the identified row to the interface management table of the new model. In this example, row No. 1 of FIG. 10(*a*) is identified and row No. 2 of FIG. 12(*a*) is added.

Subsequently, in step S603, the new model creation unit 16 creates an output interface corresponding to the currently referenced input interface. That is, in the row of FIG. 11(*a*) referred to in step S601, the new model creation unit 16 changes "I" in the "type" column to "O" and adds this row to the interface management table of the new model. In this example, row No. 1 of FIG. 11(*a*) is modified and added as row No. 3 of FIG. 12(*a*).

Next, in step S604, the new model creation unit 16 refers to output items included in the output interface created in step S603. That is, the new model creation unit 16 refers to each item in the row added to the interface management table in step S603. In this example, the new model creation unit 16 refers to the output items "branch name", "product name", "price", and "acceptable price difference" stored in the columns "item 1" through "item 4" in row No. 3 of FIG. 12(*a*).

Next, in step S605, the new model creation unit 16 determines whether an input item corresponding to the currently referenced output item exists in the original input interface. That is, among the items in the row added to the interface management table in step S603, the new model creation unit 16 identifies an item that does not exist in the row added to the interface management table in step S602. In this example, among the output items "branch name", "product name", "price", and "acceptable price difference" in row No. 3 of FIG. 12(*a*), the output item "branch name" that does not exist in row No. 2 of FIG. 12(*a*) is identified.

In step S606, the new model creation unit 16 creates a variable corresponding to this output item according to the following procedure. First, the new model creation unit 16 refers to FIG. 11(*c*) to identify a variable to which a value is assigned from an input item corresponding to this output item. Next, on the basis of information about this variable managed in the table of FIG. 11(*b*), the new model creation unit 16 adds a row to the table of FIG. 12(*b*). In this example, the variable "branch name" is identified in row No. 1 of FIG. 11(*c*) and a row identical to row No. 1 of FIG. 11(*b*) is added to the table of FIG. 12(*b*) as row No. 1.

Next, in step S607, the new model creation unit 16 creates a model element for assigning a value held by this variable to the output item. That is, first, the new model creation unit 16 adds a row to the connection management table of the new model. Then, in this added row, the new model creation unit 16 stores "variable" in the "source type" column, stores the name of the variable added in step S606 in the "source name" column, stores "interface" in the "destination type" column, and stores the name of the currently referenced output item in the "destination name" column. In this example, "branch name" is stored in the "source name" column and "branch price difference setting. branch name" is stored in the "destination name" column as shown in row No. 4 of FIG. 12(*c*).

In step S608, the new model creation unit 16 determines, according to the following procedure, whether the currently referenced output item corresponds to a key variable. First, among the items in the row added to the interface management table in step S603, the new model creation unit 16 identifies items other than the output item identified in step S605. Next, with reference to FIG. 11(*c*), the new model creation unit 16 identifies variables to which values are assigned from input items corresponding to these output items. Then, from among the identified variables shown in FIG. 11(*b*), the new model creation unit 16 identifies a variable provided with "O" in the "key" column. In this example, the output items "branch name" identified in step S605 is excluded from the output items "branch name", "product name", "price", and "acceptable price difference" in row No. 3 of FIG. 12(*a*) and the remaining output items "product name", "price", and "acceptable price difference" are identified. Then, the variables "product name", "price", and "acceptable price difference" in rows Nos. 2 through 4 of FIG. 11(*c*) are identified. It can be seen from row No. 2 of FIG. 11(*b*) that the variable "product name" is a key variable.

Subsequently, In step S609, the new model creation unit 16 creates this key variable. That is, on the basis of information about this variable managed in the table of FIG. 11(*b*), the new model creation unit 16 adds a row to the table of FIG. 12(*b*). In this example, a row identical to row No. 2 of FIG. 11(*b*) is added to FIG. 12(*b*) as row No. 2. Next, in step S610, the new model creation unit 16 creates a model element for assigning a value held by this key variable to the output item. Specifically, the new model creation unit 16 adds a row to the connection management table of the new model. Then, in this added row, the new model creation unit 16 stores "variable" in the "source type" column, stores the name of the variable added in step S609 in the "source name" column, stores "interface" in the "destination type" column, and stores the name of the currently referenced output item in the "destination name" column. In this example, "product name" is stored in the "source name" column, and "branch price difference setting. product name" is stored in the "destination name" column as shown in row No. 5 of FIG. 12(*c*).

In step S611, the new model creation unit 16 determines, according to the following procedure, whether the currently referenced output item corresponds to a variable specified as an individually definable object. First, among the items in the row added to the interface management table in step S603, the new model creation unit 16 identifies items other than the output items identified in steps S605 and S608. Next, with reference to FIG. 11(*c*), the new model creation unit 16 identifies variables to which values are assigned from input items corresponding to these output items. Then, the new model creation unit 16 determines whether the annotation detection unit 11 (see FIG. 6) has passed, to each of these variables, information indicating that the variable is an individually definable object. In this example, the output items "branch name" and "product name" identified in steps S605 and S608 are excluded from the output items "branch name", "product name", "price", and "acceptable price difference" in row No. 3 of FIG. 12(*a*), and the remaining output items "price" and "acceptable price difference" are identified. Next, from rows Nos. 3 and 4 of FIG. 11(*c*), the variables "price" and "acceptable price difference" are identified. Then, it can be seen on the basis of the information passed from the annotation detection unit 11 that the variable "price" is not an individually definable object and the variable "acceptable price difference" is an individually definable object.

In step S612, the new model creation unit 16 creates a model element for assigning a value held by an input item in the original input interface to the corresponding output item. That is, first, the new model creation unit 16 adds a row to the connection management table of the new model. Then, in this added row, the new model creation unit 16 stores "interface" in the "source type" column, stores the name of the currently referenced input item in the "source name" column, stores "interface" in the "destination type" column, and stores the name of the currently referenced output item in the "destination name" column. In this example, "price difference setting. price" is stored in the "source name" column, and "branch price difference setting. price" is stored in the "destination name" column as shown in row No. 7 of FIG. 12(*c*).

In step S613, the new model creation unit 16 creates a variable specified as an individually definable object. That is, on the basis of information about this variable managed in the table of FIG. 11(b), the new model creation unit 16 adds a row to the table of FIG. 12(b). In this example, a row identical to row No. 4 of FIG. 11(b) is added to the table of FIG. 12(b) as row No. 3.

Next, in step S614, the new model creation unit 16 creates a model element for assigning a value held by this variable to the corresponding output item. That is, first, the new model creation unit 16 adds a row to the connection management table of the new model. Then, in this added row, the new model creation unit 16 stores "variable" in the "source type" column, stores the name of the variable added in step S613 in the "source name" column, stores "interface" in the "destination type" column, and stores the name of the currently referenced output item in the "destination name" column. In this example, "acceptable price difference" is stored in the "source name" column, and "branch price difference setting. acceptable price difference" is stored in the "destination name" column as shown in row No. 6 of FIG. 12(c).

Subsequently, the new model creation unit 16 creates an individual input interface in step S617. That is, the new model creation unit 16 adds a new row to the interface management table of the new model. In this example, the added row is row No. 1 of FIG. 12(a). In this row, "branch price difference entry" and "I" are stored in the "interface name" column and the "type" column, respectively.

In step S618, the new model creation unit 16 sequentially refers to all the created variables. That is, the new model creation unit 16 refers to the variables managed in the table of FIG. 12(b). In this example, the new model creation unit 16 refers to the variables "branch name", "product name", and "acceptable price difference".

In step S619, the new model creation unit 16 adds, to the individual input interface, an input item corresponding to a currently referenced variable. That is, the new model creation unit 16 stores an item in the row added to the interface management table in step S617. In this example, in row No. 1 of FIG. 12(a), the new model creation unit 16 stores "branch name", "product name", and "acceptable price difference" in the "item 1" column, "item 2" column, and "item 3" column, respectively.

Additionally, in step S620, the new model creation unit 16 creates a model element for assigning a value held by each of these input items to the corresponding variable. That is, first, the new model creation unit 16 adds a row to the connection management table of the new model. Then, in this added row, the new model creation unit 16 stores "interface" in the "source type" column, stores the name of the input item stored in step S619 in the "source name" column, stores "variable" in the "destination type" column, and stores the name of the currently referenced variable in the "destination name" column. In this example, "branch price difference entry. branch name", "branch price difference entry. product name", and "branch price difference entry. acceptable price difference" are stored in the "source name" column. At the same time, their corresponding "branch name", "product name", and "acceptable price difference" are stored in the "destination name" column. This gives rows Nos. 1 through 3 of FIG. 12(c).

In the present embodiment, an original design model is converted to a design model that can be used individually, and a design model for individual control is generated on the input side. However, a design model for individual control may be generated on the output side. In this case, by performing the following processing, a design model can be used as a template to generate a design model that can be used individually. Specifically, the name of an original output interface which receives a value from a variable specified as an individually definable object is changed to create a new output interface. Then, by receiving values from the new output interface and adding individual information, an individual control model (new model) for calling the original output interface is created.

In the present embodiment, among several types of elements that constitute an application, a variable is specified as an individually definable object or an identification key. However, this embodiment is not limited to this. That is, other types of elements of an application may be specified similarly. For example, the conditional expression 116 may be individually set for each branch.

Although an individually definable object and an identification key are specified in a design model in the present embodiment, it is not limited to this. For example, source code for an application is displayed, and an individually definable object and an identification key may be specified in the source code.

This embodiment may be implemented by hardware, software, or a combination of both. In addition, it may be embodied as a computer, data processing system, or computer program, which can be stored on a computer-readable medium and distributed. The medium may be an electronic, magnetic, optical, electromagnetic, or semiconductor system (or device or apparatus) ("computer-readable storage medium") or a propagation medium. Examples of a computer-readable storage medium include a semiconductor or solid-state storage device, magnetic tape, removable computer diskette, random access memory (RAM), read only memory (ROM), rigid magnetic disk, and optical disk. Examples of a currently available optical disk include a compact disk read only memory (CD-ROM), compact disk read/write (CD-R/W), and digital versatile disk (DVD).

By simply specifying an element as an individually definable object and also specifying another element as an identification key by appropriate annotations as described above, an original application can be converted to an application that can be used according to the individual situation. This enables the development of the following application. That is, first, a user who has detailed knowledge about system development creates a fixed application which is not tailored to any specific situation. Subsequently, a user who is familiar with the individual situation specifies individual information, such as threshold values, output destinations, and the timing of addition of variables to be held and then converts the original application. Thus, in the present embodiment, it can be made easy to modify an existing application program according to the individual situation.

Additionally, the present embodiment can provide the following effects. First, since an existing application is not directly modified, it is possible to maintain the existing application. Next, since a mediator pattern is used to specify the modification of an application, the application can be modified with simple modification logic. Also, it is not necessary for the user who makes annotations to take the above-described aspect into consideration. At the same time, the present embodiment can be realized without using the addition of an annotation as a trigger. In other words, any method can be used as long as it is possible to specify an element as an individually definable object or an identification key.

Conventionally, it is possible to apply a technique, such as aspect orientation or mixing class, to part of a single application. However, in an environment, such as an SOA, where a system is created by combining a plurality of independent applications, an application cannot be modified without redesigning it. Alternatively, with the present embodiment, it is possible to modify an application without redesigning it.

Reference Numerals:
11: annotation detection unit
12: conversion section
13: design model storage unit
14: input interface conversion unit
15: output interface conversion unit
16: new model creation unit Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. An apparatus comprising:
   a display unit configured to display a model for an application program, wherein the model includes an input interface, an output interface, and a plurality of variables;
   a detection unit configured to detect the addition of a new variable and placement of an annotation on the display unit for the new variable, wherein the annotation identifies the new variable as an individually definable object or an identification key, wherein the identification key identifies an individual situation and the individually definable object copes with the individual situation, and
   a generation unit configured to generate a new model with a new input interface and a new output interface based, at least in part, on the annotation identifying the new variable as an individually definable object or an identification key.

2. The apparatus of claim 1, wherein the model for the application program further comprises an assignment expression, a conditional expression, and a controlling expression.

3. The apparatus of claim 1, wherein the detection unit is further configured to detect the addition of the new variable and the placement of the annotation on the display unit in response to an operation performed on the model.

4. The apparatus of claim 3, wherein the detection unit is further configured to detect the operation on the display unit by recognizing the location of the new variable and placement of the annotation on the display unit for the new variable.

5. The apparatus of claim 1, wherein the generation unit comprises an interface management table, a variable management table, and a connection management table, wherein each table includes rows and columns for managing data for generating the new input interface and the new output interface.

6. A method comprising:
   displaying a model for an application program, wherein the model includes an input interface, an output interface, and a plurality of variables;
   detecting the addition of a new variable and placement of an annotation on the display unit for the new variable, wherein the annotation identifies the new variable as an individually definable object or an identification key, wherein the identification key identifies an individual situation and the individually definable object copes with the individual situation, and
   generating a new model with a new input interface and a new output interface based, at least in part, on the annotation identifying the new variable as an individually definable object or an identification key.

7. The method of claim 6, wherein the model for the application program further comprises an assignment expression, a conditional expression, and a controlling expression.

8. The method of claim 6, further comprising detecting the addition of the new variable and the placement of the annotation on the display unit in response to an operation performed on the model.

9. The method of claim 6, further comprising detecting the operation on the display unit by recognizing the location of the new variable and placement of the annotation on the display unit for the new variable.

10. The method of claim 6, wherein the generating of the new input interface and the new output interface comprises:
    reading an interface management table, a variable management table, and a connection management table of the model,
       wherein the interface management table describes the input interface and the output interface for the model,
       wherein the variable management table indicates the plurality of variables and indicates if any of the plurality of variables are key variables,
       wherein the connection management table indicates flow of data between interfaces and the plurality of variables; and
    generating a new interface management table, a new variable management table, and a new connection management table for the new model.

11. The method of claim 6, wherein the model is used as a template for the generating of the new model.

12. One or more non-transitory computer-readable storage media encoded with instructions, which when executed by a set of one or more processors, causes the set of one or more processors to perform operations that comprise:
    displaying a model for an application program, wherein the model includes an input interface, an output interface, and a plurality of variables;
    detecting the addition of a new variable and placement of an annotation on the display unit for the new variable, wherein the annotation identifies the new variable as an individually definable object or an identification key, wherein the identification key identifies an individual situation and the individually definable object copes with the individual situation, and
    generating a new model with a new input interface and a new output interface based, at least in part, on the annotation identifying the new variable as an individually definable object or an identification key.

13. The computer-readable storage media of claim 12, wherein the model for the application program further comprises an assignment expression, a conditional expression, and a controlling expression.

14. The computer-readable storage media of claim 12, wherein the operations further comprise detecting the addition of the new variable and the placement of the annotation on the display unit in response to an operation performed on the model.

15. The computer-readable storage media of claim 12, wherein the operations further comprise:

reading an interface management table, a variable management table, and a connection management table of the model, wherein the interface management table describes the input interface and the output interface for the model, wherein the variable management table indicates the plurality of variables and indicates if any of the plurality of variables are key variables, wherein the connection management table indicates flow of data between interfaces and the plurality of variables; and generating a new interface management table, a new variable management table, and a new connection management table for the new model.

16. The computer-readable storage media of claim 12, wherein the operations further comprise using the model as a template to generate the new model for converting the application program for the individual situation.

* * * * *